(12) United States Patent
Nemeth et al.

(10) Patent No.: US 6,535,266 B1
(45) Date of Patent: Mar. 18, 2003

(54) CLOSED LOOP LCD HEATER SYSTEM

(75) Inventors: Paul R. Nemeth, Cedar Rapids, IA (US); Daniel E. Cudworth, Marion, IA (US); Donald E. Mosier, Cedar Rapids, IA (US); Ronald L. Coffin, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/464,424

(22) Filed: Dec. 16, 1999

(51) Int. Cl.[7] ............... G02F 1/133; G02F 1/1333; G02F 1/13
(52) U.S. Cl. ............... 349/161; 349/72; 349/199
(58) Field of Search ............... 349/72, 169, 199; 219/209

(56) References Cited

U.S. PATENT DOCUMENTS 5,694,191 A * 12/1997 Strathman et al. .......... 349/161
6,191,839 B1 * 2/2001 Briley et al. .......... 349/161

OTHER PUBLICATIONS

U.S. patent application S/N 09/303,729, Filed May 3, 1999, entitled "Patterned Thermal Sensor" by J. Briley et al.

* cited by examiner

Primary Examiner—Robert H. Kim
Assistant Examiner—Dung Nguyen
(74) Attorney, Agent, or Firm—Nathan O. Jensen; Kyle Eppele

(57) ABSTRACT

An LCD heater having independent closed loop control over heating for a plurality of zones on the display, wherein each zone has a relatively homogeneous heat dissipation or heat sinking properties and one of the zones is a central region of the display which is heated by an ITO film and has its temperature sensed, by a transparent sensor, at a central point within the viewable section of the LCD.

20 Claims, 2 Drawing Sheets

CLOSED LOOP LCD HEATER SYSTEM

CROSS REFERENCE TO RELATED APPLICATIONS

This application relates to a U.S. Patent application by Briley and Davis, entitled PATTERNED THERMAL SENSOR, filed on May 3,1999 and having Ser. No. 09/303,729, which application is incorporated herein in its entirety by this reference.

BACKGROUND OF THE INVENTION

The present invention relates to liquid crystal displays (LCDs) and more particularly relates to LCD heaters and even more particularly relates to systems and controls for LCD heaters.

In the past, LCD heater plates have been incorporated to increase the temperature of the LCD surface. The heater has typically been deposited material such as indium tin oxide (ITO) applied to a glass cover placed adjacent to the liquid crystal layer within the display. Electrical current was then passed through the ITO coating across the display face to generate heat.

While these LCD heaters have enjoyed considerable use in the past, they have several serious drawbacks, especially when used with the new optical compensators with thermal sensitivity. LCDs typically have varied heat dissipation characteristics. The differing rates of cooling of various portions of an LCD display typically result in differing temperatures and a concomitant optical non-uniformity.

Consequently, there exists a need for improved thermal management across the LCD assembly, in order to provide better optical performance of the display.

SUMMARY OF THE INVENTION

It is an object of the present invention to provide an improved image for LCDs.

It is a feature of the present invention to include a closed loop LCD heating system.

It is an advantage of the present invention to better manage the temperature gradient existing across an LCD viewing surface.

It is another feature of the present invention to include a plurality of closed loop heating systems, where each closed loop controls the temperature of a display region having a relatively isothermal dissipation characteristic.

It is another advantage of the present invention to provide for more precision in the heating of LCD displays.

The present invention is a method and apparatus for heating an LCD which is designed to satisfy the aforementioned needs, provide the previously stated objects, include the above-listed features, and achieve the already articulated advantages.

Accordingly, the present invention is a method and apparatus providing a plurality of independent closed loop LCD heating systems where each closed loop has associated with it a display region with generally an isothermal heat dissipation characteristic.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
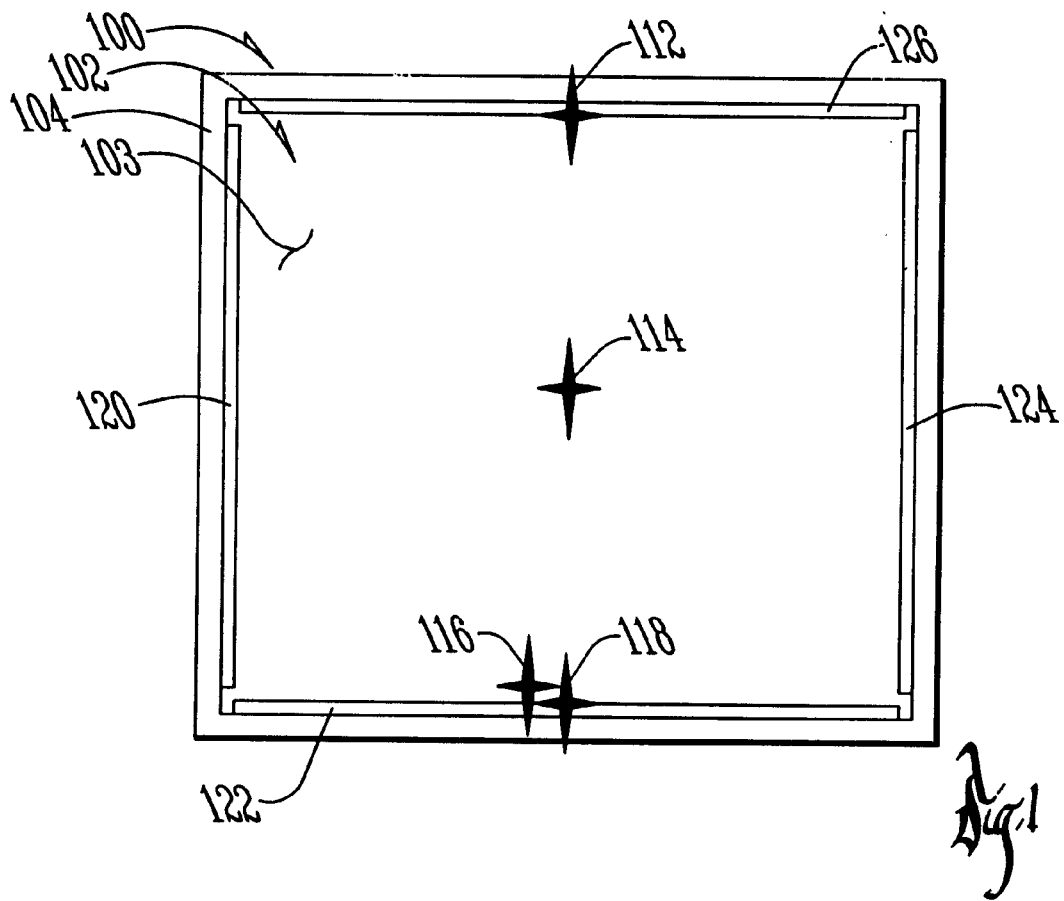
FIG. 1 is a simplified diagram of an LCD heater of the present invention.

Now referring to the drawings, wherein like numerals refer to like matter throughout, and more particularly to FIG. 1, there is shown a simplified representation of an LCD panel (either inclusive of or exclusive of associated optical components, such as polarizers, optical compensators, glass etc.), of the present invention, generally designated 100, having a viewable surface 102 with a non-viewable surface periphery 104 disposed therearound. Viewable surface 102 may have a transparent resistive heating element such as a film of ITO, or other transparent electrically conductive material, disposed thereon. Non-viewable surface periphery 104 is a common arrangement for LCDs where there may be drive electronics connections (not shown). A top thermal sensor 112 is shown disposed in a centrally located position along the top edge of the viewing area. Top thermal sensor 112 is preferably a patterned transparent sensor made of ITO or other substance and in accordance with the above cross referenced patent application.

A middle thermal sensor 114 is disposed below the top thermal sensor 112 and preferably in a similar location so as to sense the temperature at a laterally central point in the middle of the viewable surface 102. Similarly bottom thermal sensor 118 is shown disposed at a laterally central position at the bottom of the viewable surface 102. Sensors 112, 114, and 118 are preferably similar in design and operation. A reference thermistor 116 is shown disposed at the bottom of the viewable surface 102 in close proximity and at a known distance from bottom thermal sensor 118. The reference thermistor 116 is not essential, but may be preferred because the thermistor 116 would be a well-known thermal sensor which has well-known and predictably acceptable operational characteristics including, but not limited to, mean time before failure characteristics. Reference thermistor 116 is used to provide a quality check on the operation of bottom thermal sensor 118, and presumably the other similar constructed sensors 112 and 114 as well. LCD panel 100 is also shown having a left side edge heater 120, a bottom edge heater 122, a right side edge heater 124 and a top edge heater 126. Heaters 120, 122, 124 and 126 are preferably well-known foil heaters, such as those available from manufacturers, such as Minco Products, Inc. and having model numbers HFK22074. These foil heaters are preferably placed between the LCD optical stack and its mounting hardware.

The present invention divides display 100 into three independent regions, each with an associative heating control loop. The first loop comprises the top thermal sensor 112 and the top edge heater 126. The top edge of the display has a generally isothermal heat dissipation characteristic and consequently is provided with the top edge heater 126, which preferably provides generally uniform heating along the top edge of the viewable surface 102.

The middle portions of the viewable surface 102 typically have dramatically different heat dissipation characteristics from any of the edges. Additionally, the middle portions of the viewable surface 102 have a generally isothermal heat dissipation characteristic, at least when compared to the periphery of the viewing surface 102. The middle portions of the viewing surface 102, which are covered with a sheet of ITO 103, form, in combination with the middle thermal sensor 114, the second independent heating control loop. In the presently described embodiment of the present invention, the third heating control loop is comprised of the bottom thermal sensor 118, the left side edge heater 120, the bottom edge heater 122, and the right side edge heater 124. In this embodiment, the left, bottom, and side edges of the viewable surface 102 have generally similar heat dissipation characteristics, while the top edge and the middle of the viewable surface 102 each have distinctly different heat dissipation characteristics.

Figure 2:
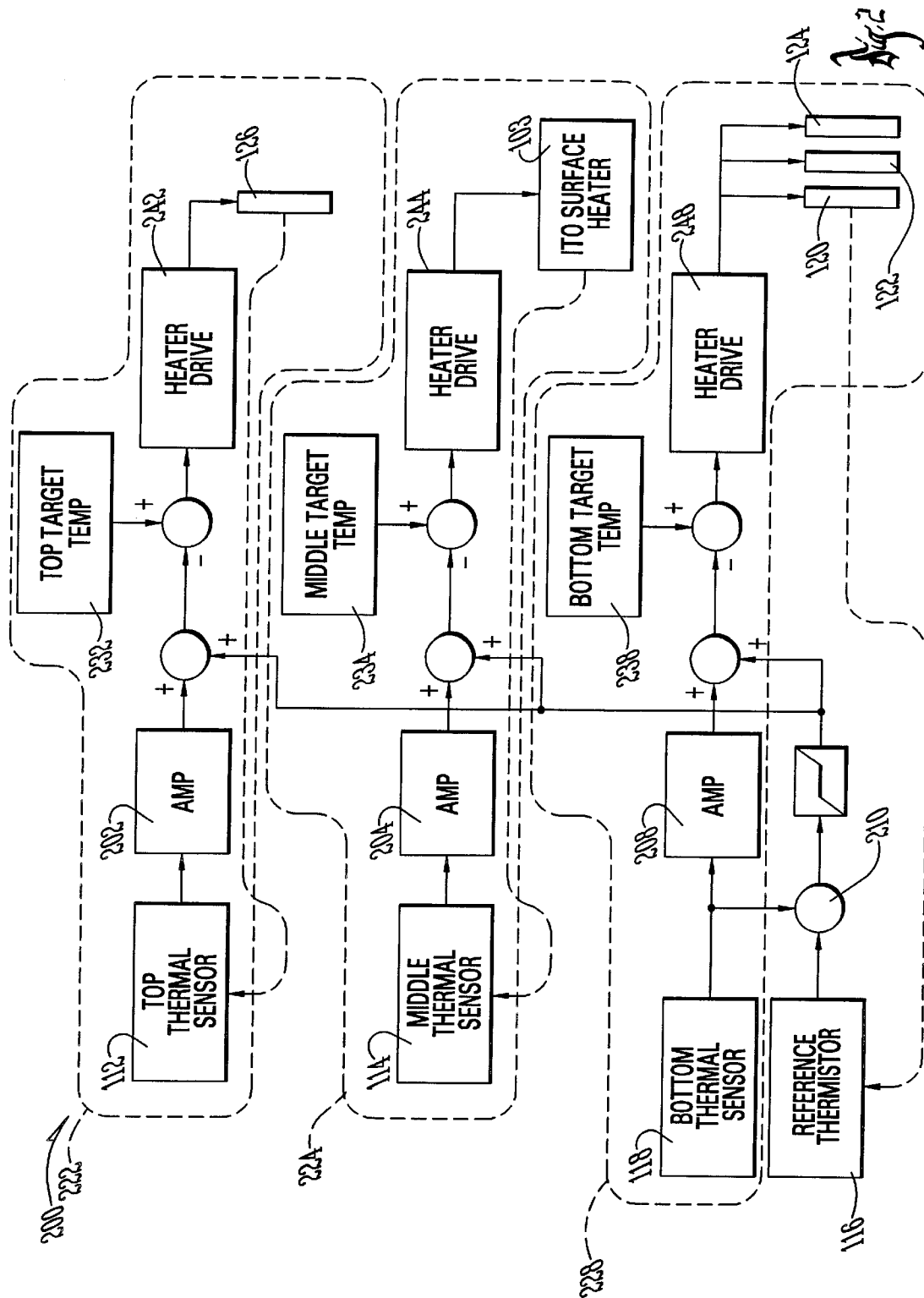
FIG. 2 is a schematic diagram of the heater of FIG. 1, where the dashed lines represent heat flow from the heaters to the thermal sensors.

Now referring to FIG. 2, there is shown a heater system of FIG. 1, generally designated 200, which clearly shows three independent control loops 222, 224, and 228, outlined by dotted lines. The bottom independent heater control loop 228 includes bottom thermal sensor 118, which senses the temperature at the bottom of the viewable surface 102 (FIG. 1) and generates a bottom thermal sensor signal which may or may not need to be amplified by amp 208. Bottom thermal sensor signal is compared, via comparator 210, with the reference thermal signal generated by reference thermistor 116. A correction signal, representative of the difference between these signals, is generated and provided to each of the control loops 222, 224, and 228, where it is combined with the amplified thermal sensor signals from thermal sensors 112, 114, and 118 respectively. The bottom thermal sensor signal, after any adjustments owing to the correction signal have been made, is compared with a bottom target temperature 238. When the corrected bottom temperature signal is lower than prescribed by the bottom target temperature 238, then the bottom heater driver 248 activates the edge heaters 120, 122, and 124. The top heating control loop 222 is operated similarly to bottom control loop 228, except that the top thermal sensor 112 does not provide input to generate a correction signal as does bottom control loop 228. Instead, the correction signal generated using bottom thermal sensor signals is used as a proxy correction signal. Top control loop 222 includes amp 202, top target temperature 232, and top heater drive 242 in method analogous to that described above for bottom control loop 228. Similarly, middle control loop 224 is similar to top control loop 222.

The term "isothermal", as used herein with respect to heat dissipation and heat sinking properties, is intended to generally convey a state of similar heat dissipation qualities and characteristics and not necessarily exact equality. A relatively isothermal relationship is truly intended. The level of homogeneity of heat dissipation characteristics to be considered "isothermal" is a matter of designer's choice.

It should be understood that the number of control loops is also a matter of designer's choice, but it is generally preferred that the number of control loops be minimized. To accomplish this, it may be desirable to provide for thermal isolation control mechanisms at various points around the display to increase the uniformity in heat dissipation. In a simplified embodiment, all of the edges would be part of one control loop, and the middle of the viewing surface would be a second control loop.

It is thought that the method and apparatus of the present invention will be understood from the foregoing description and that it will be apparent that various changes may be made in the form, construction, steps, and arrangement of the parts and steps thereof, without departing from the spirit and scope of the invention or sacrificing all of their material advantages. The form herein described is merely a preferred or exemplary embodiment thereof.

We claim:

1. An LCD comprising:
    a liquid crystal panel having a plurality of thermal dissipation zones thereon;
    plurality of thin film thermal sensors disposed on said liquid crystal panel, each of which is associated with and for independently measuring temperature of one of said plurality of thermal dissipation zones; and,
    plurality of closed loop heating systems, each of which is associated with and for independently applying heat to one of said plurality of thermal dissipation zones.

2. An LCD of claim 1 wherein each of said thermal dissipation zones has a predetermined characteristic of heat dissipation.

3. An LCD of claim 2 wherein said predetermined characteristic of heat dissipation is a predetermined level of homogeneity with respect to heat dissipation.

4. An LCD of claim 3 wherein each of said thermal dissipation zones is an isothermal dissipation zone.

5. An LCD of claim 1 wherein said plurality of thin film thermal sensors includes a transparent thermal sensor disposed across a viewable section of said LCD panel.

6. An LCD of claim 5 wherein one of said plurality of closed loop heating systems includes a feedback loop in which a temperature of one of said thermal dissipation zones is monitored for any effect on temperature of an application of heat to said one of said thermal dissipation zones.

7. An LCD of claim 6 wherein one of said plurality of thermal dissipation zones includes a centrally disposed region on said viewable section.

8. An LCD of claim 7 wherein another of said plurality of thermal dissipation zones includes an edge of said liquid crystal panel.

9. An LCD of claim 8 wherein one of said plurality of closed loop heating systems includes a foil heater disposed along said edge of said liquid crystal panel.

10. An LCD of claim 9 wherein one of said plurality of closed loop heating systems includes a planar heating element of a sheet of a transparent resistive film over said viewable section.

11. An LCD of claim 9 wherein said foil heater is disposed between said LCD panel and one of a plurality of mounts.

12. An LCD of claim 11 wherein a thermal isolating material has been coupled to one of said plurality of mounts to provide for an increase in homogeneity of heat dissipation characteristics across said liquid crystal panel.

13. An LCD of claim 12 further including a reference thermistor used to provide correction signals in output paths of said thin film thermal sensors.

14. An LCD of claim 13 wherein each of said plurality of thermal dissipation zones has a predetermined target temperature toward which a heater driver drives a temperature characteristic.

15. An LCD heater comprising:
    first thin film means for sensing a temperature of a first isothermal dissipation zone of a liquid crystal panel;
    second thin film means for sensing a temperature of a second isothermal dissipation zone of a liquid crystal panel;
    first means for independently manipulating a temperature characteristic of said first zone; and,
    second means for independently manipulating a temperature characteristic of said second zone.

16. An LCD heater of claim 15 wherein said first thin film means is transparent and disposed over a viewable section of said liquid crystal panel.

17. An LCD heater of claim 16 including a means for providing a reference temperature.

18. An LCD heater of claim 17 wherein said first means for independently manipulating a temperature comprises a foil heater disposed on an edge of said liquid crystal panel.

19. An LCD heater of claim 18 wherein second means for independently manipulating a temperature comprises a transparent thin film heater disposed on said viewable section of said liquid crystal panel.

20. A method of improving the optical characteristic of a liquid crystal display comprising the steps of:

provided a liquid crystal panel having an optical compensator thereon which is optically sensitive to thermal and mechanical stresses thereon;

dividing said liquid crystal panel into a plurality of isothermal heat dissipation zones;

providing independent temperature monitoring of said zones at points within a viewing section of said liquid crystal display; and, providing independent closed loop control of a temperature for each of said plurality of isothermal heat dissipation zones.

* * * * *